US000001283H

United States Statutory Invention Registration [19]

[11] Reg. Number: H1283

Porto et al.

[43] Published: Feb. 1, 1994

[54] WEAR-INDICATING TIRE

[76] Inventors: Andrew Porto, R.D. #11, Wainright Rd.; Carl Huben, R.D. 2, Gypsy Trail Rd., both of Carmel, N.Y. 10512

[21] Appl. No.: 613,965

[22] Filed: Nov. 13, 1990

Related U.S. Application Data

[63] Continuation of Ser. No. 377,955, Jul. 11, 1989, abandoned.

[51] Int. Cl.[5] ..... B60C 11/24

[52] U.S. Cl. ..... 152/154.2; 152/524

[58] Field of Search ..... 152/154.2, 209 R, 524, 152/523

[56] References Cited

U.S. PATENT DOCUMENTS

| | | | |
|---|---|---|---|
| 1,989,703 | 2/1935 | Leguillon | 152/524 X |
| 3,623,900 | 11/1971 | Jonnes et al. | 152/524 X |
| 3,770,040 | 11/1973 | DeCicco | 152/154.2 |
| 3,814,160 | 6/1974 | Creasey | 152/154.2 |
| 4,074,742 | 2/1978 | Chamblin | 152/154.2 |
| 4,226,274 | 10/1980 | Awaya et al. | 152/154.2 |

FOREIGN PATENT DOCUMENTS

| | | | |
|---|---|---|---|
| 12319 | 1/1985 | Japan | 152/154.2 |
| 11824 | 1/1989 | Japan | 152/524 |
| 448223 | 6/1936 | United Kingdom | 152/154.2 |

*Primary Examiner*—Michael Carone
*Attorney, Agent, or Firm*—Terry M. Gernstein

[57] ABSTRACT

A wear-indicating tire includes a tread section that is formed of a plurality of visually different plys that present a visually different effect as the tire tread wears down. The sidewall section of the tire also includes a pattern or that cooperates with the visual signal from the tire tread section to provide an overall aesthetic appearance that is pleasing.

8 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

WEAR-INDICATING TIRE

This is a continuation of copending application Ser. No. 07,377,955, filed on Jul. 11, 1989, now abandoned.

TECHNICAL FIELD OF THE INVENTION

The present invention relates to the general art of land vehicles, and to the particular field of land vehicle wheels.

BACKGROUND OF THE INVENTION

A land vehicle wheel includes a hub which is rotatably mounted on the vehicle, and a tire mounted on that hub. Rims, weights and inflation valves and the like can also be included in such a wheel. The tire includes a tread section which contacts a roadway surface, and a sidewall section which connects the tread section to the hub.

As is well known, tire treads are subject to wear, and if such wear is excessive, the tire may become dangerous. Thin and worn tire treads may make a vehicle difficult to handle, especially on snow or ice, even if the tire does not become subject to a blow-out. Blow-outs, by the very nature thereof, are extremely dangerous.

For this reason, it is important for a vehicle operator to be aware of the state of the tread wear of the tires on his vehicle at all times. Accordingly, there have been several means and methods proposed in the art for determining the state of a vehicle tire tread. These means and methods range from simply placing a penny in the tread to rather sophisticated gauges. There are even signals built into the tread itself to indicate such wear.

Such methods and means, while somewhat effective, have several drawbacks which inhibit the full commercial success of such devices and methods. Principal among such drawbacks is the failure thereof to automatically make the state of tread wear fully evident. The gauges must be applied, and thus tread wear may not be noticed until a mechanic or other such professional specifically inspects the tire; indicators are not pronounced enough to be readily apparat, and, again, may go unnoticed until a mechanic or the like specifically inspects the tire for tread wear.

Therefore, there is a need for a tire tread wear indicator that will automatically make the state of tread wear apparent enough so that this indication is pronounced and noticeable.

However, in many situations, the state of tread wear should not be made noticeable in a manner that destroys the overall aesthetics of the land vehicle. For example, if the land vehicle is an expensive automobile, the owner of that automobile does not want attention diverted from the automobile to the tires if such tires do not, themselves, enhance the aesthetic effect of the vehicle.

Thus, not only is there a need for a means of making tire tread wear automatically noticeable, there is a need for such a means as will accomplish such result in an aesthetically pleasing manner that can be integrated into the overall aesthetics of the land vehicle on which the tire is mounted.

OBJECTS OF THE INVENTION

It is a main object of the present invention to provide a means for automatically making the state of tire tread wear pronounced and noticeable.

It is another object of the present invention to provide a means for automatically making the state of tire tread wear pronounced and noticeable in an aesthetically pleasing manner.

SUMMARY OF THE INVENTION

These, and other, objects are achieved by a tire having a tread section that produces various colors for the tread section as the tread wears down. The entire tread section changes its overall aesthetic effect, either by having the entire tread section change color, or by having sufficient amounts of that section change color to change the overall aesthetic effect of that tire tread section. The sidewall section of the tire also has a pattern that co-operates with the tread section to produce an overall aesthetic effect to the overall tire that changes as the tread section changes.

Various colors, color combinations and patterns for the tread section and/or the sidewall section can be selected for the most effective appearance.

In this manner, the state of tire tread wear can be made quite apparat and noticeable, yet in a manner that actually enhances the overall aesthetic appeal of the land vehicle. For example, a changing striped pattern, or a changing solid color can be used to indicate tread wear, and the tire sidewall can be patterned and/or colored to co-ordinate with the patterns or colors adopted by the tread section. As a specific example, the tread can change from a pattern or color that is predominantly black for a new tread to a pattern or color that is predominantly amber hen the tread Wear is heavy, to a pattern or color that is predominately red when the tread wear is too heavy to be safe.

Such signals can be used by law enforcement officers, especially in states having laws, such as snow emergency laws, Which specify the maximum amount of tread wear that is permissible in certain situations.

The tire sidewall section can be patterned or colored to coordinate with such changing colors, such as by being striped, checkered or the like.

DETAILED DESCRIPTION OF THE PREFERRED EMBODIMENT OF THE INVENTION

Figure 1:
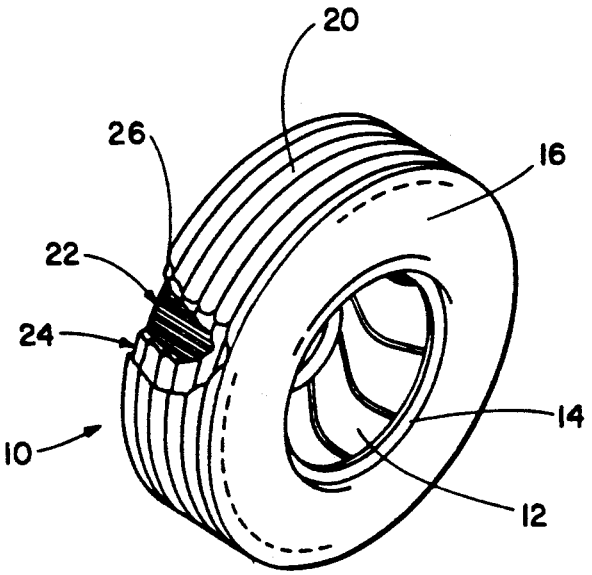
FIG. 1 is a perspective view of a tire having a tread section that changes solid colors in accordance with the present invention to indicate the state of tread wear.

Shown in FIG. 1 is a tire 10 embodying the present invention. The tire 10 is mounted on a hub 12, and has a rim 14 on which rim weights (not shown) or the like are mounted in the usual manner, and an inflation valve (not shown) as is usual to vehicle wheels. The tire 10 includes a sidewall section 16 connecting the hub to a tread section 20 that contacts a roadway surface or the like to support a vehicle.

The tire 10 can be made of vulcanized rubber in various sizes, tread types and cord types as is known to those skilled in the art. The tire can be bias, radial or bias-belted, steel belted or the like, as is also known to those skilled in the art.

The tire 10 includes a tread section that changes its appearance. such as by changing colors, to visibly indicate the state of the tread wear. The tire 10 thus includes a plurality of plies, including red ply 22 for indicating a dangerous wear condition; an amber ply 24 on top of the yellow ply to indicate that tire tread wear is heavy but not dangerous; and a black ply 26 that indicates that tire wear is new or light. The red ply is the innermost ply, the black ply the outermost ply and the amber ply interposed therebetween. These plys are coupled together in a usual tire-forming process. In the preferred embodiment, the colors are brighter as the plys wear away, that is, the amber is brighter than the black, and the red is brighter than the amber to make the tire wear-indicating feature of the invention more evident as the tread wears down. Other colors can be used without departing from the scope of the present disclosure. The tire will otherwise function and operate in a normal manner, and each ply has its own tread section with the appropriate tread patterns and the like as will occur to those skilled in the art.

Shown in FIGS. 2–6 are various embodiments of the just-described invention in which various color and pattern combinations are used to enhance the visibility of the tread wear indicator function of the invention as well as to enhance the overall aesthetic effect of the tire.

Figure 2:
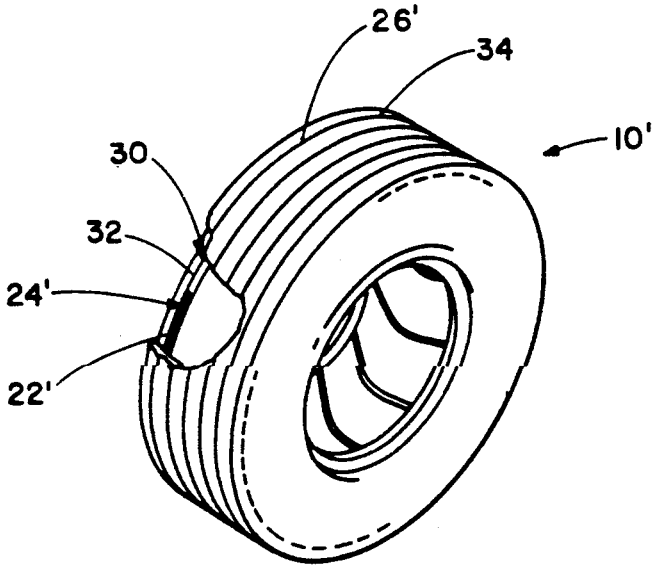
FIG. 2 is a perspective view of a tire having a tread section that changes striped colors in accordance With the present invention to indicate the state of tread wear.

Thus, in a tire $10^1$ shown in FIG. 2, the tread section includes plys $22^1$ through $26^1$ that have bright stripes 30, 32 and 34 respectively therein. The stripes of the individual plys are colored, for example, red, amber and black respectively as discussed above so that ply $22^1$, for example, includes red stripes, and so forth.

Figure 3:
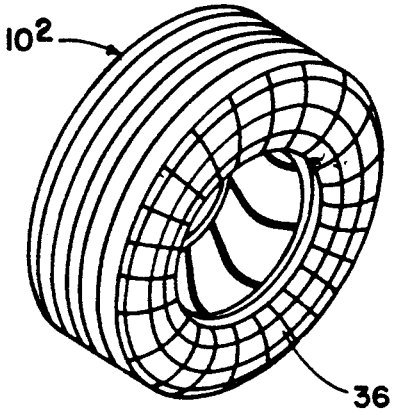
FIG. 3 is a perspective view of a tire having a tread section that changes striped colors and has a patterned sidewall section in accordance with the present invention to indicate the state of tread wear.
Figure 4:
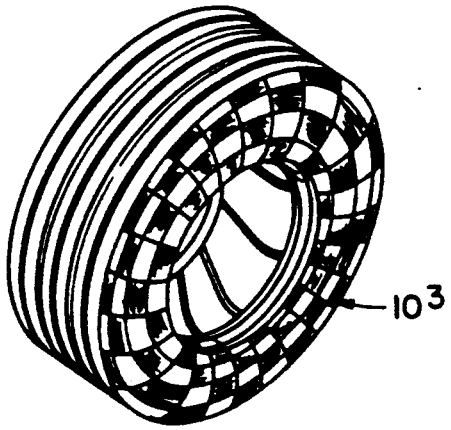
FIG. 4 is a perspective view of a tire having a tread section that changes striped colors and has a patterned sidewall section in accordance with the present invention to indicate the state of tread wear.

In the tires 10 and $10^1$, the sidewall sections are plain and unadorned; however, in the tire $10^2$, the sidewall section 36 is patterned, such as cross hatched as shown in FIG. 3, or checkered as shown in FIG. 4 for tire $10^3$, or the like to enhance the aesthetic appeal of the tire tread section pattern or color scheme, which can include either the solid pattern shown in FIG. 1 or the stripped pattern shown in FIG. 2, or the like.

Figure 5:
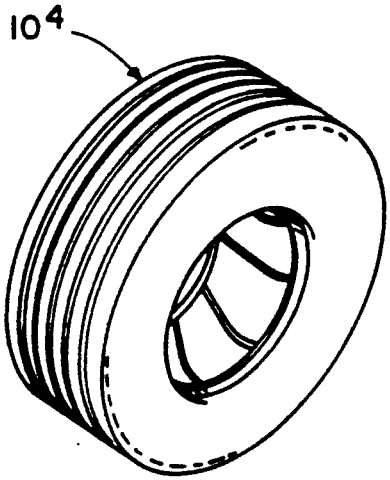
FIG. 5 is a perspective view of a tire having a tread section that changes patterned colors in accordance with the present invention to indicate the state of tread wear.
Figure 6:
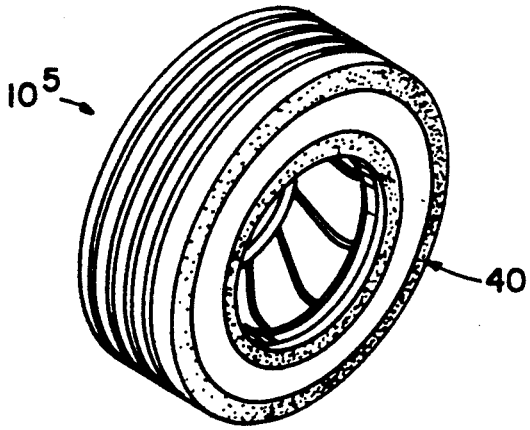
FIG. 6 is a perspective view of a tire having a tread section that changes striped colors and has a striped sidewall section in accordance with the present invention to indicate the state of tread wear.

A color pattern is shown for tire $10^4$ in FIG. 5 in conjunction with a plain and unadorned sidewall, and in conjunction with a patterned sidewall, such as striped sidewall 40 for a tire $10^5$ in FIG. 6. The tire $10^4$ includes a plurality of plys, each of which includes a plurality of pattern shapes, such as shape 44, that are all different from each other on each ply. The ply patterns can differ from each other as well or be repeated. That is, the innermost ply (the red ply) will have a set of differing patterns, the middle ply (the amber ply) will have a set of differing patterns that can be the same as the innermost ply or have different patterns and so forth. Each shape in each set differs from the shapes in that set. The stripes in any of the striped configurations can be the same color as each other or can be multicolored as suitable. The color pattern can be the diverse shape combination shown in FIG. 5, or some other such pattern.

It is understood that while certain forms of the present invention have been illustrated and described herein, it is not to be limited to the specific forms or arrangements of parts described and shown.

We claim:

1. A tire for use on a land vehicle wheel comprising:

A) a sidewall section; and

B) a tread section connected to said sidewall section and which includes indicating means for indicating the state of tire tread wear, said indicating means including a plurality of different plys connected together in layers and each covering essentially the entire surface area of said tread section and each having a treat pattern which extends over the entire surface area of the tread section with an innermost layer having a pattern shape which is different visually from the pattern shapes of all other plys, each ply further including a color which is different from the color of all plys so that as said tread section wears down during use of the tire, visually different plys will be exposed to indicate the state of the tread wear, a double warning being formed by the different color and different tread pattern of the innermost layer.

2. The tire defined in claim 1 wherein said plys include a predominately black ply, a predominately amber ply and said innermost layer being predominately red.

3. The tire defined in claim 2 wherein said plys are solid colors.

4. The tire defined in claim 2 wherein said plys are striped colors.

5. The tire defined in claim 2 wherein said sidewall section includes a pattern thereon.

6. The tire defined in claim 5 wherein said sidewall pattern includes a crosshatched pattern.

7. The tire defined in claim 5 wherein said sidewall pattern includes a checkerboard pattern.

8. The tire defined in claim 5 wherein said sidewall pattern includes a striped pattern.

* * * * *